(12) United States Patent
Quintel

(10) Patent No.: US 8,916,835 B1
(45) Date of Patent: Dec. 23, 2014

(54) UV LAMP SUPPORT ASSEMBLY

(71) Applicant: Eaton Corporation, Cleveland, OH (US)

(72) Inventor: Mark Anthony Quintel, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/276,226

(22) Filed: May 13, 2014

Related U.S. Application Data

(60) Provisional application No. 61/837,965, filed on Jun. 21, 2013.

(51) Int. Cl.
*A61L 2/10* (2006.01)
*C02F 1/32* (2006.01)

(52) U.S. Cl.
CPC . *C02F 1/325* (2013.01); *A61L 2/10* (2013.01); *C02F 2303/04* (2013.01); *C02F 2201/3227* (2013.01)
USPC .......................................... 250/436; 250/435

(58) Field of Classification Search
USPC ...................... 250/436, 435, 455.11
See application file for complete search history.

(56) References Cited

U.S. PATENT DOCUMENTS 2,667,584 A * 1/1954 Rhodes .......................... 250/430
2011/0303855 A1 12/2011 Lee et al.

FOREIGN PATENT DOCUMENTS

WO    WO 03/072508        9/2003

OTHER PUBLICATIONS

PCT/US2014/043331 Notification of Transmittal of International Search Report International Search Report Written Opinion of International Searching Authority, Oct. 9, 2014.

* cited by examiner

*Primary Examiner* — Kiet T Nguyen
(74) *Attorney, Agent, or Firm* — Walker & Jocke

(57) ABSTRACT

A fluid treatment system includes plural housings (10, 78). Each housing includes quartz tubes (16, 80) fixedly supported at an upper plate (12, 106) while being movably supported at a lower plate (14, 104). Each tube has a UV light emitter that can eradicate microorganisms in a liquid. The tube support arrangement includes a plurality of tube retainer assemblies. Each retainer assembly includes a tube holding cup (30, 90) surrounded by a coil spring (24, 94). Each cup includes an upper lip (34), a lower lip (36), and a foot (42). The lips retain the cup in a lower plate aperture (20,116) while the foot engages the tube's domed end. A cup can hold a tube in the lower plate while constraining lateral movement of the tube, providing spring-biased axial support to the tube, and allowing axially-extending thermal expansion of the tube.

20 Claims, 10 Drawing Sheets

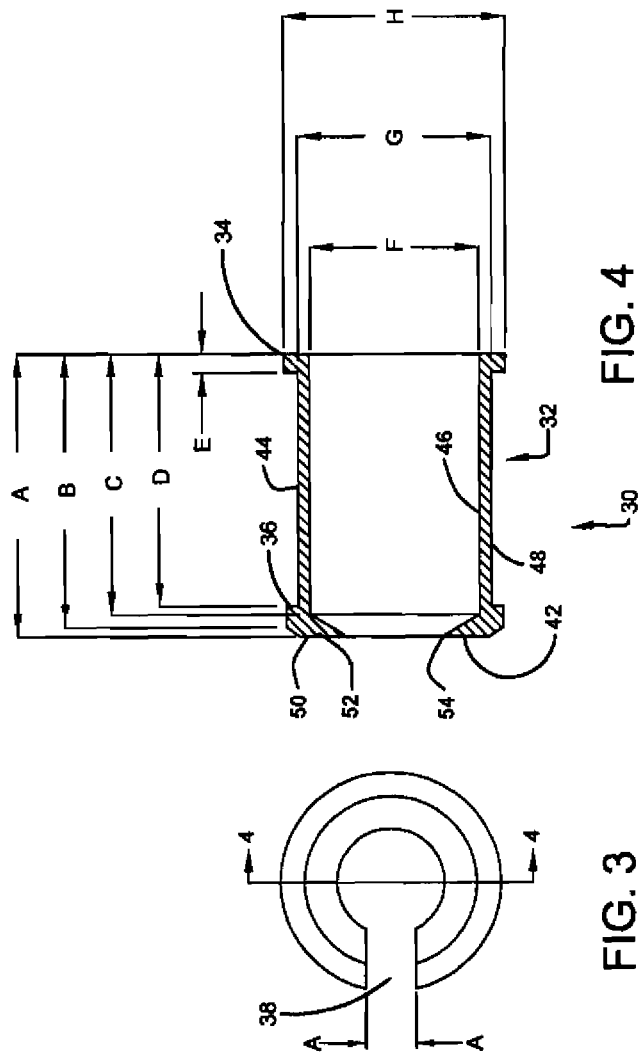

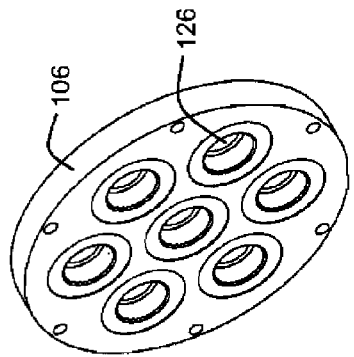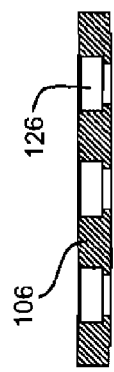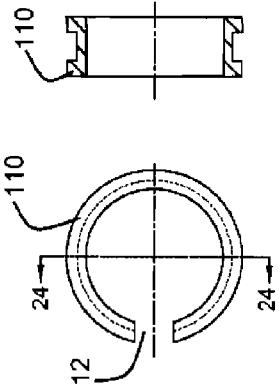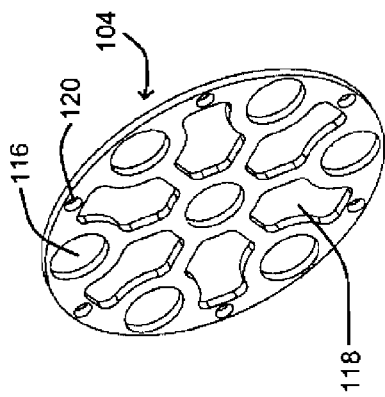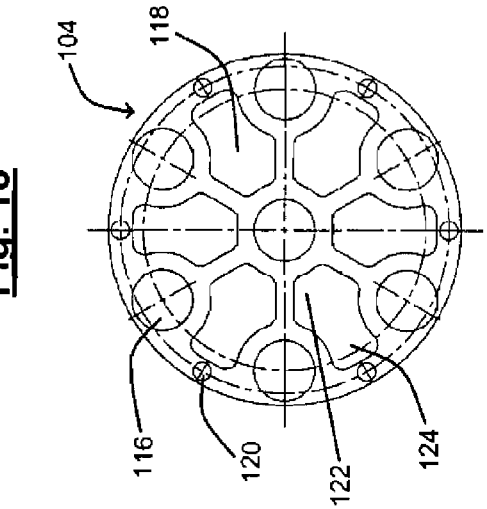

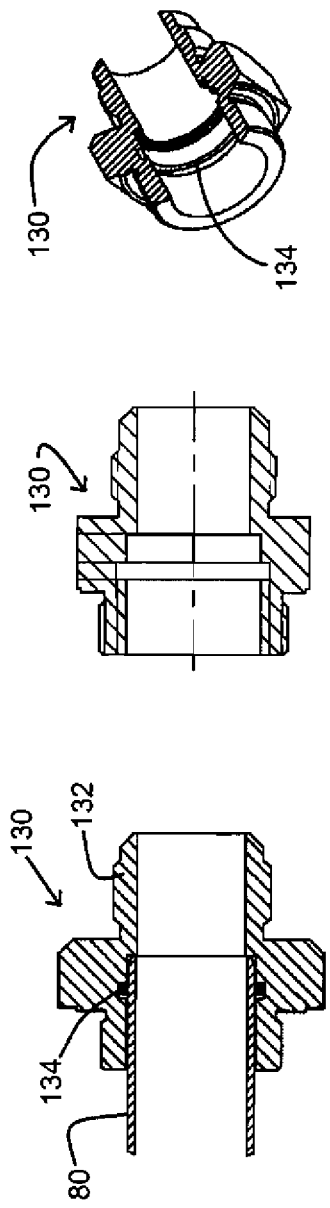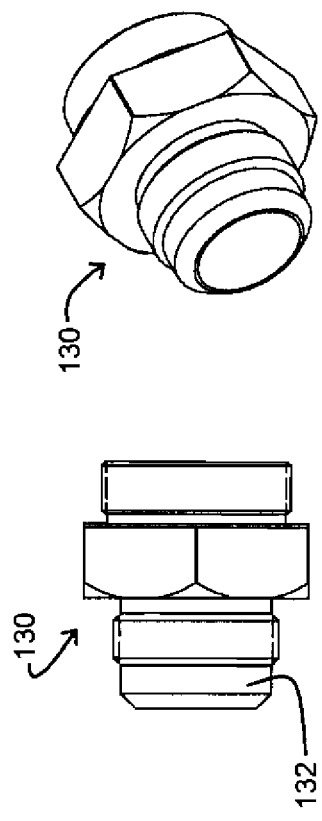

US 8,916,835 B1

UV LAMP SUPPORT ASSEMBLY

CROSS REFERENCE TO RELATED APPLICATION

This application claims benefit pursuant to 35 U.S.C. §119(e) of U.S. provisional application 61/837,965 filed Jun. 21, 2013, which is herein incorporated by reference in its entirety.

TECHNICAL FIELD

This invention relates to a fluid treatment apparatus that is operable to treat fluids containing impurities. This invention further relates to a fluid treatment system that is capable of employing irradiation during treatment of liquid.

BACKGROUND OF INVENTION

Treatment of fluid materials is required in many processes to treat or remove impurities or other contaminants. Fluid treatment is often accomplished by causing a liquid to flow through a filter material which causes contaminants to be separated and to collect on or in the filter material. Fluid treatment of liquid may involve use of irradiation. Liquid that has been cleansed of contaminants and impurities can then be directed to appropriate uses and processes that can only be carried out after the cleansing treatment has been provided.

The pressure and temperature environments involved in liquid treatment can cause difficulties, especially regarding structural support in a turbulent flow of liquid. Considerable labor, effort, and expense may be required as a result of structural damage or failure.

Liquid treatment systems may benefit from improvements, including a support arrangement that provides enhanced support and also allows for easier installation and removal of support structure.

SUMMARY OF DISCLOSURE

This application discloses exemplary arrangements for a fluid treatment apparatus and process. The apparatus and process provides treatment to fluids containing contaminants. The apparatus and process also provides for disinfection of the fluid to eradicate microorganisms through use of irradiation, such as ultraviolet (UV) light. The fluid treatment apparatus includes an enhanced support arrangement for supporting tubes that emit the radiation. Methods for installing and removing the radiation tubes with respect to their supports are also disclosed.

BRIEF DESCRIPTION OF DRAWINGS

FIG. 3 shows an end view of an exemplary tube-holding cup.

FIG. 4 shows a side sectional view of the cup taken along line 4-4 of FIG. 3.

FIG. 18 shows a view of an exemplary upper cover plate.

FIG. 19 shows a cross sectional side view of the cover plate taken along line 19-19 in FIG. 18.

FIG. 20 shows an angle view of a face of the cover plate.

FIG. 21 shows a view of an exemplary middle and lower support plate.

FIG. 22 shows an angle view of a face of the middle and lower support plate.

FIG. 23 shows an end view of a slotted bushing.

FIG. 24 shows cross sectional view of the bushing taken along line 24-24 in FIG. 23.

FIG. 25 shows a quartz tube connected to an upper adapter.

FIG. 26 shows cross sectional side view of an adapter for an upper end of a UV light emitting quartz tube.

FIG. 27 shows cut away angled view of the upper adapter used in FIG. 25.

FIG. 28 shows an exterior side view of the upper adapter in FIG. 27.

FIG. 29 shows an angle view of the upper adapter in FIG. 28.

DETAILED DESCRIPTION

Figure 1:
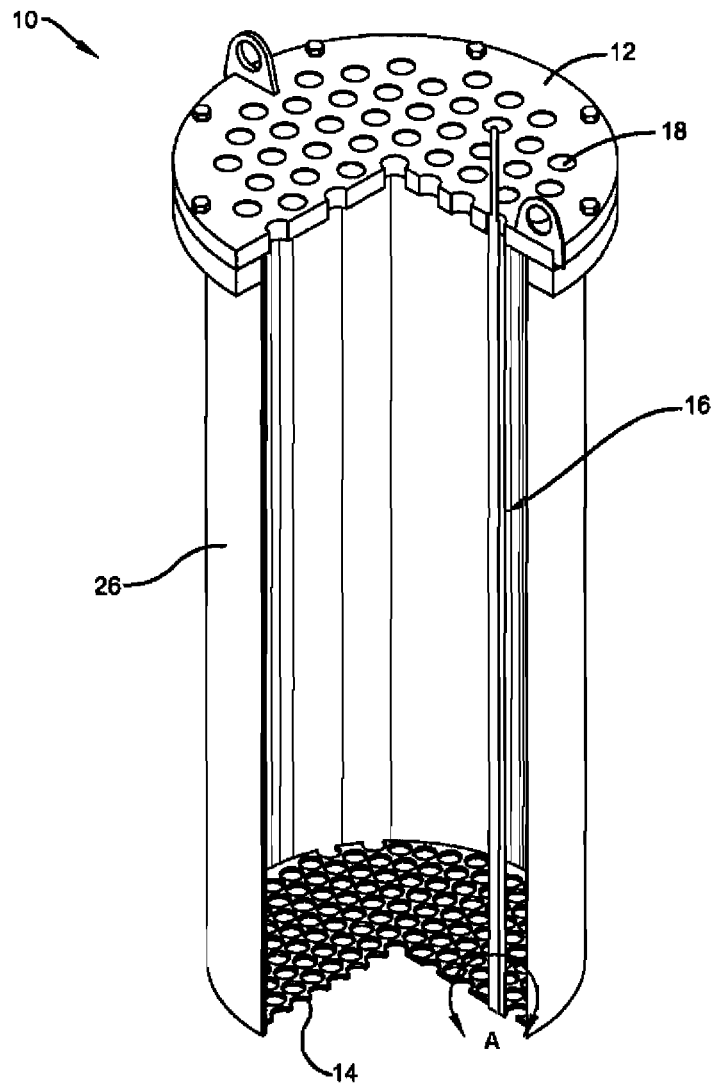
FIG. 1 shows an exemplary support arrangement for a plurality of radiation tubes of a fluid treatment apparatus.

Referring now to the drawings, and particularly to FIG. 1, there is shown an example housing 10 used for providing irradiation of fluid material. The example housing 10 may be used in devices for treating liquids in high pressure, high flow applications. It should be understood that the principles described herein may be used with numerous different types of fluids and fluid treatment arrangements. For example, the principles described herein may be used with the features and arrangements shown in U.S. application Ser. No. 13/713,522 filed Dec. 13, 2012, which is herein incorporated by reference in its entirety.

In an example arrangement, the housing 10 may be positioned within a vessel to irradiate fluid that has been cleansed of particulates by having first passed through filter elements. In such an example arrangement, fluid flow structures within the vessel may be configured so that fluid passes through the housing and is irradiated before it reaches the outlet of the vessel.

It should be understood that an exemplary fluid treatment apparatus discussed herein can be used within or in conjunction with a fluid filtration system. The fluid treatment can also be implemented at different operational stages of a filtration system. For example, one or more fluid treatment apparatus may be arranged such that a fluid is irradiated before, after, and/or while the fluid is passed through material-removing filter elements of the filtration system.

In example arrangements, the described housing and irradiation arrangement may be used to treat ballast water of ships to reduce environmental contamination, including invasive species. However, it should be understood that this use is exemplary, and the features and arrangements described herein may be used for numerous purposes and in various applications.

In an exemplary arrangement, a fluid treatment system is operable to expose a fluid to a predetermined level of radiation which is capable of killing bacteria and other microorganisms. Thus, the treated fluid can be substantially free of contaminating or unwanted organisms.

The example housing 10 includes a first (top, upper) support plate 12, a second (bottom, lower) support plate 14, and a cylindrical (side) wall 26 that axially extends between the plates 12, 14. The housing 10 may also be referred to herein as a chamber. The plates 12, 14 can be metal plates or other suitable material that is compatible with the fluid and does not deteriorate with exposure to the radiation sources utilized.

The chamber 10 is sized to hold a plurality of tubes 16 supported between the support plates 12, 14, where each tube (or sleeve) 16 includes an electromagnetic radiation source. For clarity, only a single tube 16 is shown supported between the two plates 12, 14 in FIG. 1. In an exemplary embodiment the tube 16 comprises an electromagnetic radiation-emitting quartz tube.

In an exemplary embodiment the electromagnetic radiation source can emit UV radiation, such as ultraviolet germicidal radiation (UVGI). UVGI can utilize short-wavelength ultraviolet radiation (UV-C) that is harmful to microorganisms. Thus, emitted UVGI can be used to kill microorganisms in an exemplary fluid treatment system. The UVGI can act as a disinfectant or sanitizer. In an exemplary embodiment, the UV light emitting source employed can be used in a variety of fluid treatment applications, including water cleansing or purification.

It should be understood that some embodiments can use sources of electromagnetic radiation with frequencies that are outside of the UV spectrum range. That is, the principles described herein may be used with other types of radiation emitters and/or radiation sources.

In an exemplary operation, fluid (e.g., liquid) is caused to enter the housing 10. The liquid then undergoes purification (which includes UV irradiation). Then the liquid is caused to exit the housing 10. Differences in fluid pressure between the fluid inlet and the fluid outlet of the housing 10 is one manner in which movement of the liquid can be controlled.

The exemplary first support plate 12 is configured to support a first (upper) end of the quartz tube 16. This upper support arrangement allows for a fluid pressure tight seal to be provided between the tube 16 and the first plate 12. The first plate 12 includes a plurality of support apertures 18, each of which is diametrically sized to receive a first end of a quartz tube.

It should be understood that the first end of the quartz tube 16 (or cylinder) can be supported by various types of support arrangements. Further, while the components may be described with regard to a particular orientation such as upper/lower or left/right, it should be understood that this is merely to facilitate the description of the exemplary embodiments, and the structures described may have various orientations. Features that may be used in conjunction with some exemplary arrangements are shown in U.S. application Ser. No. 13/858,390 filed Apr. 8, 2013, which is herein incorporated by reference in its entirety.

The upper end of a tube 16 may be open, which allows electrical connections (and wires) to the UV lamps to pass therein. The seal between the tube 16 and the upper plate 12 prevents the electrical components from contacting fluid being treated. In contrast, the lower (opposite) end of the tube 16 may be closed. A closed end of a tube 16 may be configured as a domed end.

Figure 2:
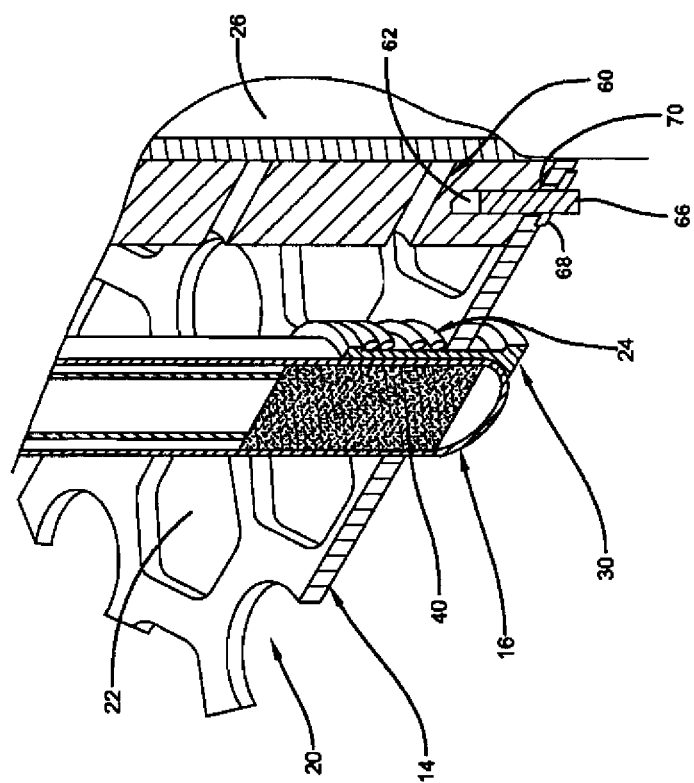
FIG. 2 shows an angled view in the area circular indicated A in FIG. 1, which includes a quartz tube being supported by the exemplary support arrangement.

As shown in FIG. 2, the exemplary second support plate 14 includes both support apertures 20 and fluid flow apertures 22. The lower support apertures 20 are configured to assist in supporting the second (lower) end of the quartz tube 16. That is, the support apertures 20 are each diametrically sized to receive the lower end of the quartz tube 16. Thus, the support apertures 20 can have a cylindrical (annular) shape that corresponds to the cylindrical shape of the lower domed end of the quartz tube 16. Of course the diameter of each aperture 20 is greater than the diameter of the domed end.

In contrast to the support apertures 20, the example fluid flow apertures 22 are not required to be directed to any tube matching shape. Thus, the flow apertures 22 can have a configuration that contributes to desired fluid flow through the support plate 14. For example, a flow aperture 22 may alternatively have a hexagonal, octagonal, or non symmetrical configuration. Furthermore, not all of the flow apertures 22 have to have a same configuration.

As discussed later, the lower support arrangement is configured to provide constraint to the quartz tube 16, especially in the lateral (radial) direction. As can be appreciated, this lower tube support is especially beneficial in a turbulent flow environment. As discussed in more detail hereafter, the lower support arrangement for the quartz tube 16 at its lower end can involve the second (lower) support plate 14, a (compression) spring 24, and a tube-holding cup 30.

FIG. 3 shows an end view of a retainer cup 30 of the exemplary embodiment. As shown in FIG. 4, the exemplary cup 30 (or retainer) comprises a cylindrical body 32, a first (upper) annular radially extending projection (lip) 34 at a first end thereof, and a second (lower) annular radially extending projection (lip) 36 at a second end thereof. The exemplary cup 30 also includes at least one split (axial opening) 38. An interior area of a cup 30 is sized to receive therein the lower domed end of the quartz tube 16.

In some embodiments a cup 30 can comprise a single slot 38 that axially extends through the entire cup 30, including the cylindrical body 32 and both lips 34, 36. In other embodiments a slot 38 may axially extend only partly through the cup 30. For example, one cup may have a single slot 38 that extends through only one of the annular lips. Another cup may have a single slot 38 that extends through one annular lip but only a portion of the cup body 32. Still other cup embodiments may have a plurality of spaced slots 38, including slots of different axial lengths.

FIG. 2 also shows an enlarged view of the lower end of an installed quartz tube 16 being supported by the lower support plate 14 in an exemplary support arrangement that includes the cup 30. In its installed position, the cup 30 extends through one of the support apertures 20 in the lower support plate 14. The spring 24 surrounds the cup body 32. The spring 24 axially extends between (and engages) the upper lip 34 and a top surface of the support plate 14. The force of the spring 24 biases the lower lip 36 toward engagement with a bottom (underside) surface of the support plate 14. The lower domed end of the tube 16 is received in the interior area of the cup 30. The example tube 16 shown in FIG. 2 also contains a UV lamp 40 therein.

The cup 30 can be formed of a resilient flexible material, such as a plastic and/or a polymer. For example, an exemplary cup 30 can comprise chlorinated polyvinyl chloride (CPVC). In other cup embodiments other known materials may be used to fabricate the cup, including other thermoplastics (e.g., PVC) and polymers.

The slot portion 38 of the cup 30 may be formed by creating a slit after the cup was formed (fabricated). Alternatively, the slot 38 may be a part of the originally fabricated cup. That is, a cup 30 may be formed with an existing slot 38. The slot 38 allows the flexible material (adjacent the slot 38) to be compressed radially inwardly. The cup compressing may be performed manually and/or with a tool.

While in the compressed state, the outer diameter of the lower lip 36 is reduced. While its outer diameter is being reduced in size, the lower lip 36 can pass through a support aperture 20 in the lower support plate 14. After passing through the aperture 20, the cup 30 can then be released to automatically return to its normal (not compressed) state. Thus, in the installed position of the cup 30, the lower lip 36 is located below the support plate 14 and the upper lip 34 is located above the support plate 14. In this installed position, both lips 34, 36 have their normal undeformed outer diameter. The operational outer diameter of a lip is greater than the diameter of the support aperture 20 in the lower support plate 14. Thus, with the cup 30 installed in the plate 14, both annular lips 34, 36 are prevented from passing through the aperture 20 during operation of a fluid treatment system. The arrangement locks the cup to the support plate 14. As a result, the cup 30 is securely retained in operative connection with the support plate 14.

As can be seen in cross section in FIG. 4, the cup 30 also includes a flexible lower annular foot 42. The foot 42 is located adjacent (and radially interior of) the lower annular lip 36. As shown in the cup's installed position of FIG. 2, the foot 42 (portion of cup 30) can be configured for engagement with the domed end of an inserted quartz tube 16. For example, the foot can have a radially inwardly extending curvature that substantially corresponds to curvature of the tube's domed end. The annular foot's curvature can result in a larger contact surface area between the foot and the tube 16. The lower annular foot 42, which extends radially inward to an interior diameter, may also be referred herein to as a lowermost or inward annular lip.

The foot 42, the lower annular lip 36, the body 32, and the upper annular lip 34 are integrally connected. In an exemplary embodiment the cup 30 is a one-piece construction, which includes each of a first annular lip 34, a second annular lip 36, and a third annular lip 42.

As can be appreciated, the cup/tube engagement can provide (relative to the center axis of the cup 30) both lateral (radial) and longitudinal (axial) support to the inserted tube 16. The lateral support can be provided by the cup body 32 radially extending between the tube 16 and the support plate 14. That is, the cup 30 can be sized to reduce the gap between the tube 16 and the support plate 14. Lateral play between the tube 16 and the support plate 14 is constrained by the cup's predetermined configuration. Also, the flexible nature of the cup material allows it to act as a (lateral) damper for the tube 16, which assists in preventing damage to the tube caused by laterally directed forces acting against the lower end of the tube. Thus, the cup 30 provides the tube 16 with enhanced lateral stability.

As discussed in more detail later, axial support for the tube 16 can be provided by the spring 24 axially biasing the foot portion 42 (upward) toward the support plate 14. This spring biasing force is imparted to the tube through engagement between the foot 42 and the tube 16.

An open slot (or slit) section 38 of the exemplary cup 30 creates an axially extending opening in the undeformed condition that has the lateral (transverse) distance A-A in FIG. 3. As previously discussed, this slot 38 can have an axial length that corresponds to the entire length of the cup 30. In an example embodiment, the slot 38 of a cup (in its undeformed condition) has axial and transverse dimensions of predetermined lengths.

It should be understood that the relative proportions A-H shown for the cup 30 in the example embodiment of FIG. 4 are for illustrative purposes. Nor are they necessarily to scale. Also, the shown proportions are but one of many cup configurations that may be used. That is, in other cup embodiments other dimensional relations and proportions may be used.

Figure 6:
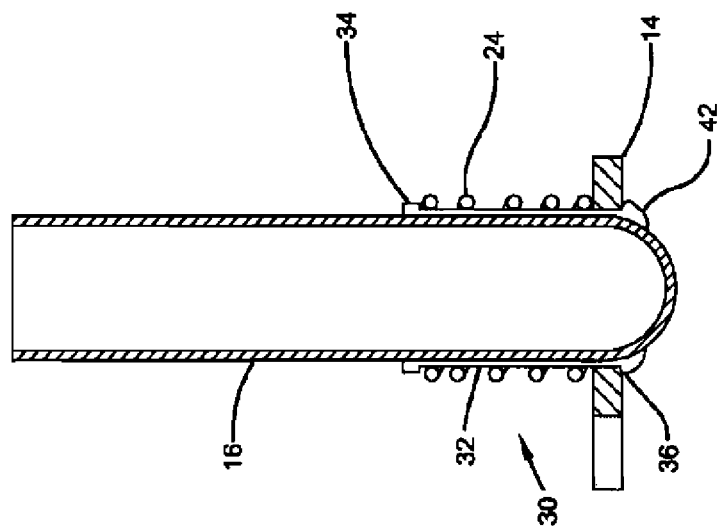
FIG. 6 shows a view of a tube support arrangement taken along line 6-6 of FIG. 5.
Figure 5:
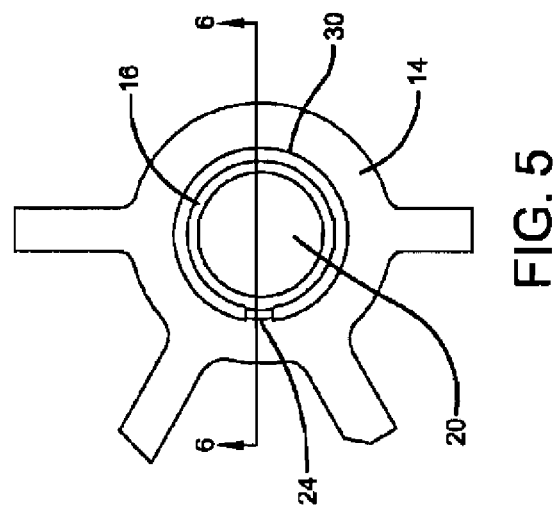
FIG. 5 shows an end view of a quartz tube installed in an exemplary tube-holding cup which extends in a lower support plate.

FIG. 5 shows an assembled relationship among an exemplary quartz tube 16, a spring 24, a cup 30, and a support aperture 20 in the lower support plate 14. The spring 24 can be seen through the slot 38. FIG. 6 shows a side view taken along line 6-6 of FIG. 5.

Figure 7:
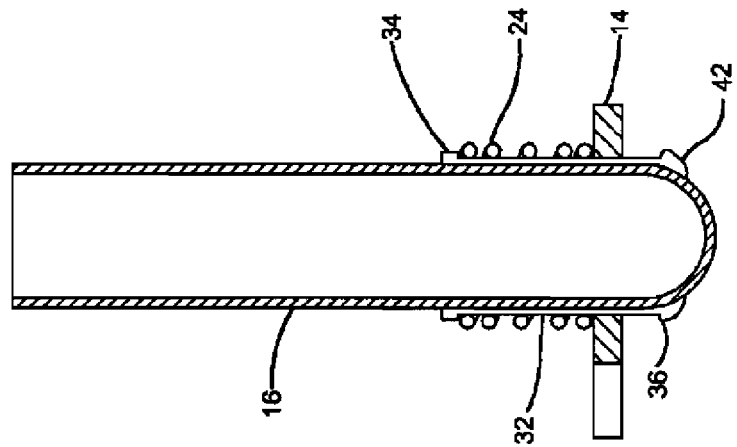
FIG. 7 shows the tube support arrangement of FIG. 6, but with the quartz tube causing compression of the coil spring.

FIG. 7 shows a situation where the spring 24 is being compressed between the support plate 14 and the upper lip (normal installation) 34. As discussed in more detail later, the spring 24 can be compressed as a result of factors such as the weight of the tube 16, the dimensional relationships of the components, negative pressure effects, and some thermal expansion of the tube in the axial (downward) direction. The spring loaded cup 30 is able to apply a (small) amount of force in the upward direction to overcome these (downward) compressing factors, e.g., the tube weight, dimensional relationships, etc. As a result, the cup can minimize the amount of stress on the (glue) joint securing the quartz tube upper end to an (upper) adapter, which is discussed in more detail later. FIG. 7 shows the assembled tube 16 with an intended compression.

Figure 8:
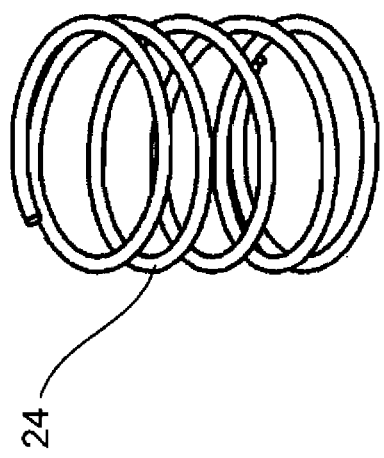
FIG. 8 shows an example of an exemplary coil spring.

FIG. 8 shows an enlarged view of the coil spring 24 by itself. The spring 24 is configured to surround the cup 30 between the lips 34, 36. It should be understood that different embodiments of the exemplary cup 30 can have different dimensions and/or different materials.

As can be seen from FIG. 5 and FIG. 6, the cup 30 in an operative position substantially surrounds an axial portion of the tube 16 while this tube portion extends through a support aperture 20 in the support plate 14. Thus, the cup 30 in an operative position produces a tube support arrangement that prevents the tube 16 from contacting the support plate 14.

In an exemplary embodiment, the cup 30 has a configuration that enables it to hold a quartz tube 16 that has a domed lower end. As shown in FIG. 6, the configuration of the cup allows at least part of this domed end to extend out of the cup. However, it should be understood that the cup 30 can also hold tubes having other shaped ends, including a flat straight lower end.

As can be seen in FIG. 4, the body 32 of the cup 30 (while in a non compressed condition) has an axially-extending cylindrical body segment 44. This body segment 44 comprises a segment inner surface 46 and a segment outer surface 48.

The segment inner surface 46 can have a substantially constant diameter (as represented by the indicator F in FIG. 4). The segment inner surface 46 can have an axial length (as represented by the indicator C) which extends through the axial length (as represented by the indicator E) of the annular lips 34, 36. The segment inner surface 46 can substantially correspond in dimensional diameter (as represented by the indicator F) to the outer diameter of a cylindrical quartz tube 16.

The segment outer surface 48 can comprise a substantially constant diameter (as represented by the indicator G). The segment outer surface 48 can extend between (and up to) the annular lips 34, 36. The annular lips 34, 36 can extend radially outward (as represented by the indicator H) further than the segment outer surface 48 (as represented by the indicator G). The segment outer surface 48 can have an axial length (as represented by the distance D minus distance E). In the example configuration, the axial length of the segment outer surface 48 plus the axial length of the annular lips 34, 36 (as represented by the indicator E) can substantially equal the axial length of the segment inner surface 46 (as represented by the indicator C).

The body segment 44 can have a substantially constant radial thickness (as represented by the distance G minus distance F) axially extending between the annular lips 34, 36, with a greater radial thickness (as represented by the distance H minus distance F) at the annular lips. The annular lips 34, 36 can extend radially outward a substantially same distance, which results in a same outer diameter (and a same lip thickness). The annular lips 34, 36 can also have a substantially same axial length (as represented by the indicator E).

The exemplary cup 30 can have a foot portion 42. The foot 42 can comprise an annular foot segment 50 located adjacent to the lower annular lip 36. The foot segment 50 can comprise an angled flange 52 that flares radially inward while tapering in thickness up to its innermost diameter. Thus, the thinnest portion 54 of the flange 52 can be at its innermost diameter 54. The radial thickness of the flange 52 can decrease from top to bottom while moving radially inward, which can result in the thinnest/innermost portion 54 of the flange 52 being at the lowermost part of the flange 52.

In the example configuration, the innermost diameter 54 of the foot segment 50 can be smaller than the inner diameter of the body segment 44 (which is represented by the indicator F). From the diameter of the segment inner surface 46, the inner surface 56 of the flange 52 can extend radially inward in a downwardly sloping direction at a predetermined angle (e.g., 45 or 60 degrees). As can be appreciated, this inwardly sloping inner surface 56 of the flange 52 allows for a larger surface contact area between the foot segment 50 and the domed end of a tube 16. Again, in other embodiments other cup proportions/configurations may be used.

With an exemplary cup configuration, including its slot 38 and its flexible material, a tube 16 is allowed to be (relatively) slid into the interior area of the cup while the tube's outer surface snugly contacts the inner surface segment 46 of the cup. A tube 16 can have a predetermined length that allows it to be properly positioned and held between the upper support plate 12 and the lower support plate 14. The tube 16 can continue to be inserted until its domed end engages the foot segment 50. The thinner section 54 of the flange 52 is more flexible than the remainder of the flange, which allows for lateral (flexible) play. Thus, the flange 52 enables the foot segment 50 to be slightly flexed radially outward (by contact with the domed end) to allow further (downward) axial movement of the tube 16 as needed during tube installation.

In some situations, such foot flexing may be generated by previously discussed factors that cause (downward) movement of at least part of the tube in the axial direction. Again, these factors can be associated with tube weight, dimensional relationships, effects of negative pressure, and/or thermal expansion. For example, during such tube movement the foot segment 50 may slide further up the tube dome (and be flexed further radially outward) as the dome moves downward. However, the foot flexing can have a predetermined limit that is based on the configuration of the domed end. Once the foot segment 50 cannot be flexed any further, then additional downward movement of the tube 16 causes the entire cup 30 to move downward. As discussed in further detail later, this additional downward movement can comprise a force that is sufficient to overcome the axial biasing force of the spring 24.

As can be appreciated, the exemplary support arrangement can constrain (sideways) movement of a radiation source tube 16 while simultaneously providing (tube supporting) spring force to the tube in an axial direction away from the support plate 14, which is a generally upward direction in the Figures. The spring force provided by the spring 24 acts against the upper side surface of the lower support plate 14. As can be appreciated, this additional upward force assists in enhanced support of the tube 16 at the upper support plate 12. This upward force additionally acts to resist (constrain) lateral movement of the tube 16. That is, the spring force provided by the exemplary support arrangement not only provides axial support for the tube, but it also beneficially contributes to providing lateral support for the tube. Such two-fold preventive action (against tube movement) contributes to structural protection of a brittle quartz tube. Thus, the exemplary tube support arrangement provides an enhanced support structure for an exemplary fluid treatment system that employs UV light emitting quartz tubes.

The exemplary tube support arrangement allows for movement of a quartz tube 16 during operating conditions, which can include tube expansion movement due to high temperature operation and/or changes in fluid operating temperature (heat expansion). During an axial expansion, a cup-held quartz tube 16 may elongate and press against the cup foot 42 in a downward direction. The foot 42 and the upper annular lip 34 are integrally connected. Thus, downward movement of the foot 42 causes the upper lip 34 to likewise move downward. Downward movement of the upper lip 34 causes the spring 24 to be compressed against the support plate 14. This spring compression produces a resistive biasing force axially directed against the tube. The axial position of the upper lip 34 relative to the foot 42 can be a predetermined spacing (distance) which allows for safe full axial movement of the tube 16 before the upper lip 34 could come within a predetermined distance of (or near) the support plate 14.

In the exemplary support arrangement, the more the cup 30 is moved (pushed) lower by movement of a radiation emitting tube 16, then the more the spring 24 gets compressed (as shown in FIG. 7). That is, the tube 16 can move from a non moved position where the lower annular lip 36 may engage the bottom of the support plate 14 (as shown in FIG. 6), to a moved position where the lower annular lip 36 has been pushed (downward) away from the support plate 14 (as shown in FIG. 7). Again, the domed end of the tube 16 is configured to engagingly push against the foot 42 which is integral with the upper annular lip 34. Thus, as the upper lip 34 moves downward toward the support plate 14, the spring 24 can be compressed.

During a tube movement process (which causes spring compression) the tube 16 can remain in engagement with the foot 42 while still being surrounded by the cup 30. As a result, both lateral and axial support is provided to the tube 16, even during a thermal expansion of the tube. Likewise, the tube 16 is reliably supported both axially and laterally as it or other structures contract (shrink) during cooling. Further, the exemplary arrangement of axially movable biased cups 30 allows for accommodating different tubes which may vary in length.

Figure 10:
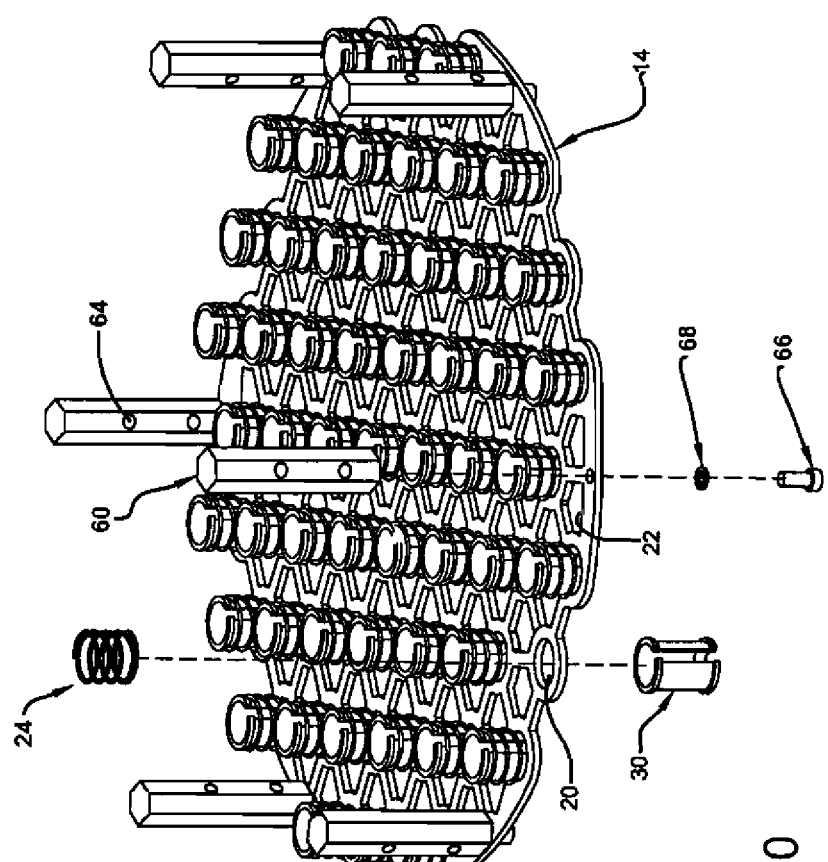
FIG. 10 shows a lower support plate assembled with a plurality of exemplary spring-loaded tube-holding cups.

FIG. 10 shows an exploded view of an exemplary lower support plate 14 comprising installed spring-loaded cups 30. As previously discussed, the lower support plate 14 includes both support apertures 20 and fluid flow apertures 22, where the flow apertures 22 can have a configuration (e.g., hexagonal) that differs from the configuration (e.g., annular) of the support apertures 20. The spring force can act to push a cup 30 toward its uppermost operational position. At this uppermost position the lower annular lip 36 is engaged with the bottom (underside) surface of the lower support plate 14. The spring force can be set relative to the (engaging) contact surface area between the lower annular lip 36 and the lower support plate 14 to prevent further upward movement of the cup 30 upon lower annular lip contact with the support plate 14.

FIG. 10 also shows exemplary blocks 60 (or pieces or structure) which can be fastened to both the lower support plate 14 and the cylindrical wall 26 of the housing 10. In an exemplary arrangement, the blocks 60 can act as vertical support columns. The blocks 60 can be positioned adjacent to an outer circumference of the support plate 14. The blocks 60 can have various cross-sectional shapes, including hexagonal, etc. The blocks 60 are configured for usage in releasibly holding (supporting) the lower support plate 14 in a correct position relative to the housing 10 (and the upper support plate 12).

As can be seen from FIG. 2 and FIG. 10, each block 60 can include at least one female opening 62 at its bottom end and plural female openings 64 at a side thereof. These openings 62, 64 are able to receive a respective fastener component. As seen in FIG. 2, a bottom opening 62 is oriented to axially receive a fastener that connects the lower support plate 14 to a block 60. As seen in FIG. 10, a side opening 64 is oriented to radially receive a fastener that connects the cylindrical housing wall 26 to a block 60.

In some embodiments the bottom openings 62 and side openings 64 are each configured to receive a screw. Thus, the openings 62, 64 may be threaded. In other embodiments the fastener openings 62, 64 can be configured to receive a bolt. In alternative embodiments the fastener openings 62 may receive a screw while the fastener openings 64 receive a bolt, or vice versa. Various different fastener arrangements may be used in different embodiments.

A (cap) screw 66 and a washer 68 can be used to fasten (secure) the lower end of a block 60 to the lower support plate 14. The screw 66 can be received in the block opening 62. The support plate 14 can include a fastener opening (or aperture) 70 through which a screw 66 is received. Alternatively, the block 60 may rest over a fluid flow aperture 22 when using a washer that has a greater diameter than the flow aperture 22. That is, instead of using a designated lower support plate fastener opening 70, some fastening embodiments may use an existing fluid flow aperture 22 as a lower support plate fastener opening. The remaining flow area through the partially covered flow aperture 22 can be a predetermined factor in overall flow amount control.

Figure 9:
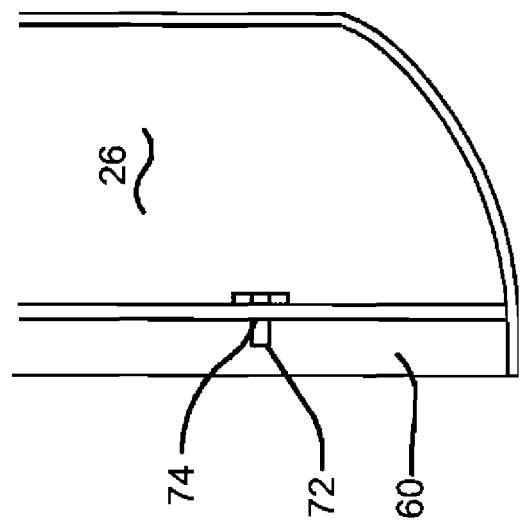
FIG. 9 shows a fastener extending through a housing side wall and into a support block of a fluid treatment apparatus.

Similarly, a screw (or a bolt) can be received in a block's side opening 64 to fasten the block 60 to the cylindrical wall 26 of the housing 10. As shown in the cut away version of FIG. 9, a bolt (or a screw) 72 can extend through the housing wall 26, which causes the block 60 (and the lower support plate 14 which is fastened to the block) to be secured to the housing 10. The cylindrical housing wall 26 can include a fastener opening 74 through which a bolt 72 is received. All of the positions of the openings 62, 64, 70, 74 can be predetermined to ensure that the lower support plate 14 is properly supported in correct alignment and orientation.

In alternative embodiments, the cylindrical wall 26 can include an inner flange portion to which a block 60 can be securely connected. In certain embodiments, all of the fastening members 66, 72 are removable, which allows the quartz tube support structure to be easily disassembled and reassembled.

In an exemplary embodiment, a block 60 is used to indirectly fasten the lower support plate 14 to the cylindrical housing wall 26. That is, instead of a direct fastening arrangement, the lower support plate 14 is fastened to housing wall 26 via the intermediary blocks 60. However, other embodiments can include directly fastening the lower plate 14 to the housing wall 26.

Assembly of the exemplary quartz tube support arrangement can be performed using differently arranged orders of process steps. For example, the lower portion of a cup 30 can be flexed to enable the lower lip 36 to pass through a lower support plate aperture 20. Next, the upper portion of the cup 30 can be flexed to enable a spring 24 to be installed between the upper lip 34 and the lower support plate 14. After all of the cups 30 and springs 24 are installed, then the blocks 60 can be fastened to the lower support plate 14. Next the lower support plate 14 can be placed into the housing 10. Next the blocks 60 can be fastened to the cylindrical wall 26 of the housing 10. Next the lower end of respective quartz tubes 16 can be placed into respective cups 30. Before their placement, the quartz tubes 16 may already be supported by the upper support plate 12. Again, the precise order of steps involved in a process of assembling the exemplary quartz tube support arrangement can vary. For example, some steps can be switched. However, in an exemplary assembly method the final result (of a completely assembled state) can be the same. Disassembly can be conducted by reversing the steps.

In an exemplary irradiation operation, fluid can flow into one end of the housing 10 and out of one or more fluid passages adjacent to an opposed end. For example, liquid may enter the housing 10 through openings in the upper support plate 12, then be subjected to UV radiation from UV lamps housed in the quartz tubes 16, and then eventually exit the housing through fluid flow apertures 22 in the lower support plate 14. In other irradiation operation embodiments other directions of fluid flow can be used.

In some fluid flow configurations, the exterior of the upper support plate 12 may be configured so as to be positioned outside the vessel or other structure in which the housing 10 is positioned. This positioning may enable electrical connectors to the UV lamps to be isolated from the fluid being treated. In such arrangements the housing cylindrical wall 26 may include suitable fluid openings to enable (radial) fluid flow into the housing.

As previously discussed, the chamber 10 shown in FIG. 1 is configured to support a plurality of radiation tubes 16 between the support plates 12, 14. In some servicing (or repair) situations, it may be necessary to remove the entire upper support plate 12 in order to replace a single tube 16. With such a large upper support plate 12, the servicing operation can be time consuming. Furthermore, during this servicing period the remaining tubes in the chamber 10 may also be considered as out of service. Having so many radiation tubes out of service at the same time may detrimentally affect the fluid treating ability of the entire system.

Figure 12:
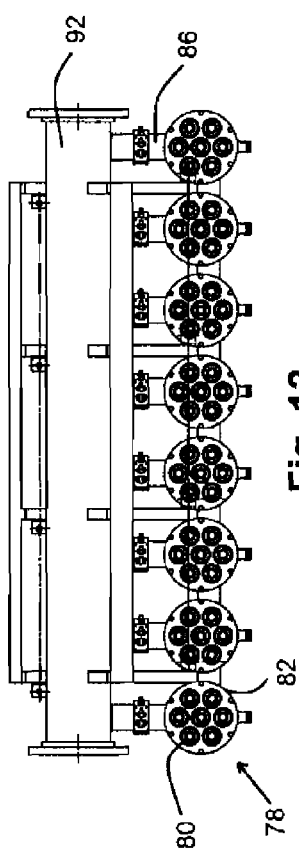
FIG. 12 shows a top view of the chamber arrangement in FIG. 11.
Figure 11:
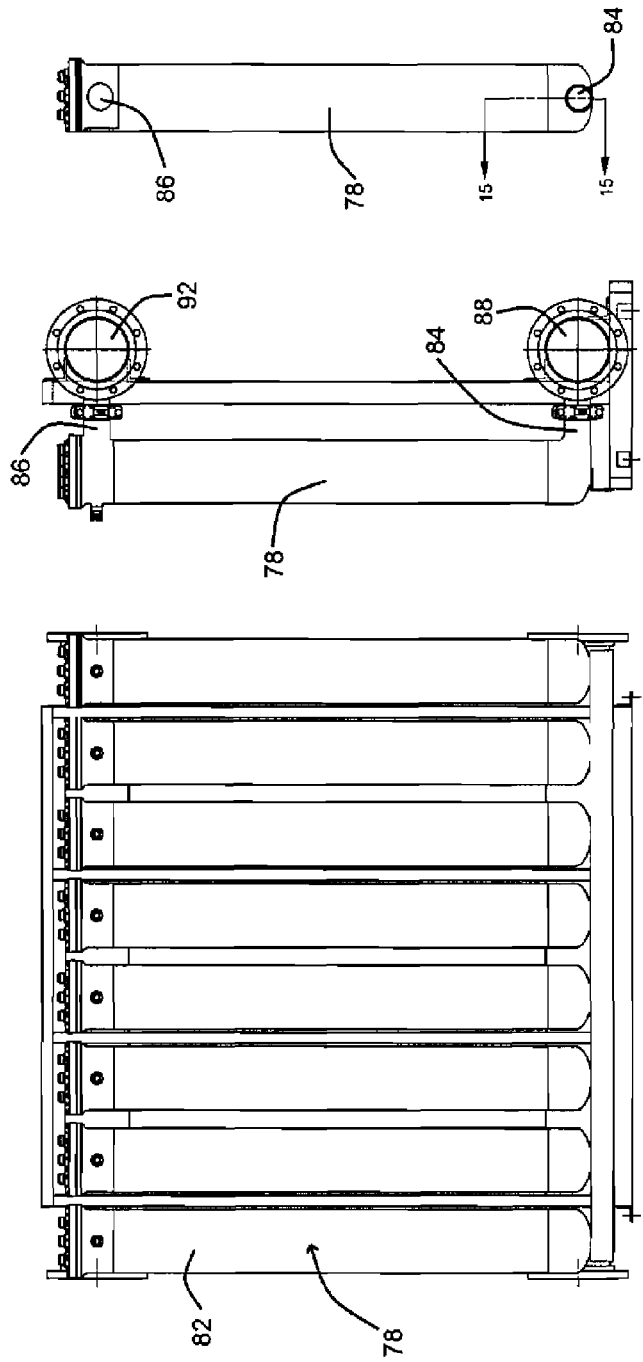
FIG. 11 shows a front view of an exemplary arrangement of interconnected fluid treatment chambers which contain UV light emitting tubes.

FIG. 11 and FIG. 12 show another embodiment of exemplary treatment chambers 78 for a fluid treatment system. In comparison to the chamber (or vessel) 10 shown in FIG. 1, each chamber 78 has a smaller size and thus holds fewer irradiating tubes 80. As can be appreciated, the configuration of an exemplary chamber 78 allows for easier and quicker tube replacement. Furthermore, during a chamber servicing period the small number of tubes out of service need not affect the fluid treatment ability of the entire treatment system.

In some arrangements the tubes 80 may be of the same dimensions as the previously discussed tubes 16. In such situations either of the radiation tubes 16, 80 can be used in either chamber 10, 78. In other embodiments the tubes 80 can differ in dimension from the tubes 16. The tubes 80 can also contain a similar source of electromagnetic radiation as the tubes 16. Also, the intensity level of radiation emitted by the tubes 16, 80 can be similar or it can differ.

FIG. 12 shows an arrangement of connected chambers 78. In an exemplary embodiment each chamber 78 is essentially identical in configuration. However, in alternative embodiments an arrangement of connected chambers may comprise at least one chamber of a different configuration and/or orientation.

Figure 13:
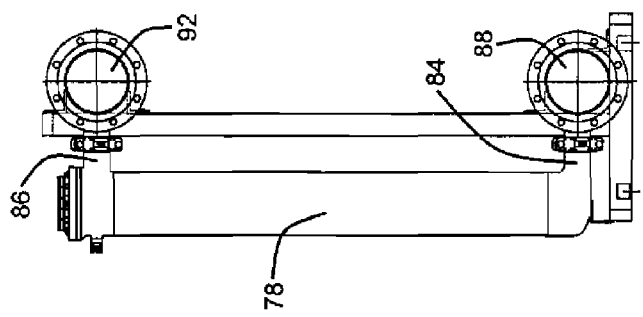
FIG. 13 shows a side view of the chamber arrangement in FIG. 11.

Each exemplary chamber 78 can have a cylindrical outer wall 82. As can be seen from FIG. 12 and FIG. 13, each chamber 78 can also have a fluid inlet 84 connected to a common inlet flow pipe 88. Each chamber 78 can further have a fluid outlet 86 connected to a common outlet flow pipe 92.

In some exemplary embodiments, valves (or other fluid control devices) are provided to enable the control of fluid flow through each inlet 88 and outlet 86. Such an arrangement allows for an individual chamber 78 to be independently isolated from the rest of the chambers 78 in the fluid treatment system. Thus, an exemplary arrangement with such fluid control valves allows for fluid treatment to proceed in the system while servicing is being carried out on a specific isolated chamber. Of course this approach is exemplary and other approaches may be used.

Figure 15:
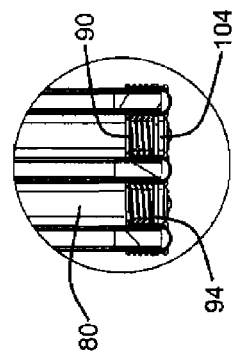
FIG. 15 shows an interior portion of a chamber taken along line 15-15 in FIG. 14.
Figure 14:
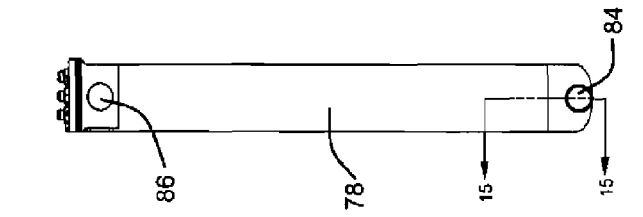
FIG. 14 shows a rear view of a chamber in FIG. 11.

FIG. 14 is a side view of an individual chamber 78, facing an inlet 84 and an outlet 86. FIG. 15 is a cross-section view taken along section 15-15 of FIG. 14. The exemplary chamber 78 also allows use of a tube-holding cup 90. The cup 90 can be used as in the previously discussed embodiments regarding a cup 30. Thus, the cup 90 along with an associated spring 94 can be used to hold a quartz tube 80 in a lower support plate 104 of the chamber 78, as shown in FIG. 15.

Figure 17:
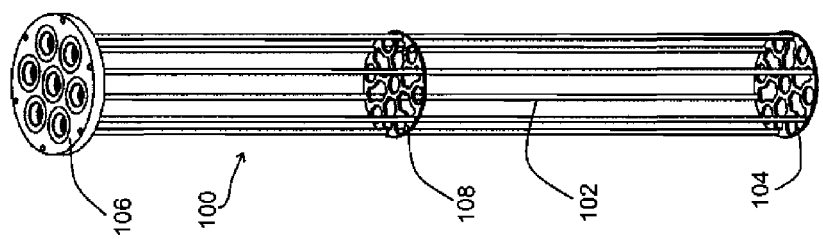
FIG. 17 shows the support assembly of FIG. 16 sans the tubes and other components.
Figure 16:
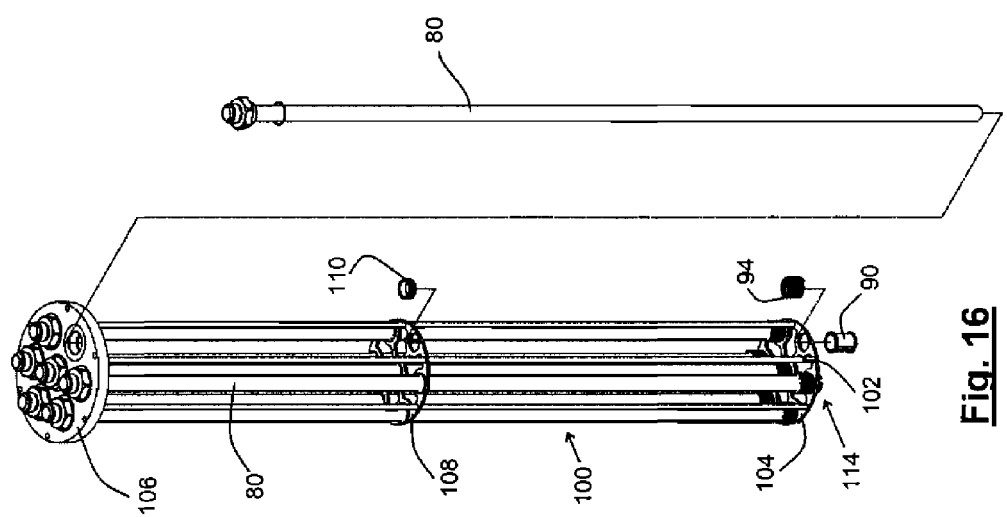
FIG. 16 shows an exemplary support cage assembly holding a cluster of quartz tubes.

FIG. 16 shows an exploded view of an individual chamber 78 being free of its outer wall 82. The chamber includes a structural cage assembly 100, which provides support for the tubes 80. FIG. 17 shows the support cage assembly 100 of FIG. 16 but without the tubes 80.

As shown in FIG. 16 and FIG. 17, the cage assembly 100 includes a plurality of support members 102 connected to the end support plates 104, 106. A support member 102 may have a rod-like configuration. An axially extending support rod 102 can be a member comprised of a suitably strong material, such as metal. For example, a support member 102 may comprise a straight axially-extending cylindrical element of solid (or hollow) metal. A support rod 102 can have an outer diameter that is smaller than the outer diameter of a cylindrical tube 78. In an exemplary embodiment of a support cage assembly 100, the support rods 102 are radially located adjacent (near) the outer circumference of the end plates 104, 106, as shown in FIG. 17.

The support rods 102 (and the tubes 78) extend through an intermediate (mid or center) support plate 108. In an exemplary embodiment the center support plate 108 and the lower support plate 104 have substantially identical configurations. In alternative embodiments the mid plate 108 and the lower support plate 104 can differ in configurations. A slotted bushing 110 can be used to protect and laterally support a tube 80 extending through the mid plate 108.

As can be appreciated, the outside of the chambers 78 is not exposed to the fluid being treated. That is, in an exemplary embodiment the exterior side of each of the lower plate 104, the cylindrical wall 82, and the cover plate 106 do not contact the fluid. Thus, the exemplary UV fluid treatment arrangement allows for electrical connections to be kept outside of the chambers 78. For example, electrical connections may be located on top of the cover plate 106, and kept dry thereat. With the exterior of a chamber not touched by contaminating fluid, improved safety may be achieved during chamber handling and transport.

FIG. 16 also shows an adapter assembly 114 comprising a cup 90 and an associated coil spring 94. In a manner previously discussed, the cup/spring assembly 114 can be used to supportingly hold a microbe destroying, radiation emitter tube 80 in the lower support plate 104.

FIGS. 18, 19, and 20 show different views of an upper (cover) plate 106. The cover plate 106 can include a plurality of support apertures (openings) 126 therethrough. As discussed in more detail later, a support aperture 126 can be configured to enable the upper end of a tube 80 to be maintained in supported relation with the cover plate 106.

FIGS. 21 and 22 show different views of a lower support plate 104 (and an equivalent center plate 108). The lower support plate 104 includes a plurality of differently configured openings. These openings include tube support apertures 116, flow apertures 118, and support rod apertures 120. The tube support apertures 116 are sized for passage therein by a quartz tube 80. The support rod apertures 120 are sized for passage therein by a support rod 102. The support rod apertures 120 can be spaced a predetermined distance from (each other and) the outer circumferential edge of the plates 104, 106, 108 to enable fluid flow to travel completely around the support rods 102.

The flow apertures 118 are specifically configured to produce flow restricted passageways which cause (upward) flow to be dispersed more evenly through the chamber 78. A flow restricting (or directing) opening 118 can comprise an inner portion 122 that is wider than an outer portion 124. As a result, a larger flow area can be inwardly positioned. Again, in alternative embodiments the mid (intermediate) plate 108 and the lower plate 104 may differ in configuration, where the mid plate 108 has differently contoured flow apertures and patterns.

FIGS. 23 and 24 show different views of a bushing 110. The bushing can comprise flexible material, similar to the previously discussed cups 30, 90. The bushing 110 can also include an axially extending slot 112. The slot 112 allows the flexible bushing 110 to be snap-fit into annular secure engagement with a tube support aperture 116 in the center plate 108. In other embodiments other bushing configurations may be used.

FIGS. 25, 26, and 27 show different views of interior portions of upper connecting adapters 130 for the tubes 80. An upper adapter 130 can be connected to the upper end of a tube 80. An axially extending end portion 132 of an upper adapter 130 is dimensioned to fit through a support aperture 126 in the upper support plate 106, as shown in FIG. 18. The upper adapter 130 allows the upper end of a tube 80 to be securely supported relative to the upper plate 106. The upper adapter 130 allows for a fluid pressure tight seal to be provided between the tube 80 and the upper plate 106.

The annular contacting engagement between the upper adapter 130 and the upper support plate 106 can cause a tube 80 to be removably supported by the upper support plate 106 in a manner that does not allow axial movement of the tube's upper end relative to the support plate 106. In contrast, the assembly 114 of the cup 90 and spring 94 allows axial movement of the tube's lower end relative to the lower plate 104. Thus, the cup/spring assembly 114 allows an elongated tube 80 to move (e.g., expand) a small distance in a longitudinal direction along its axis while simultaneously preventing (or restricting) the tube 80 from moving in a (lateral or sideways) direction that is transverse or (perpendicular) to the longitudinal direction.

The upper (top) adapter 130 can be fixedly secured to the upper end of the tube 80. For example, a silicone adhesive or adhesive sealant (e.g., Loctite) can be used to fasten the upper adapter 130 to the tube 80. An O-ring 134 (or other sealing element) can also be used to enhance the connection sealing. The O-ring 134 can fit in an O-ring groove of the adapter 130, as shown in FIG. 25. FIG. 26 shows an adapter 130 prior to insertion of an O-ring 134. FIGS. 28 and 29 show different views of exterior portions of an upper adapter 130.

As previously noted, in some arrangements of an exemplary chamber the fluid may flow upward from inlet openings in the lower end to outlet openings adjacent the upper end. Thus, the fluid flows parallel to the longitudinal axis of the irradiating tubes. However, in other arrangements fluid may be made to flow downward. That is, the inlet and outlet openings can be switched, with the fluid flowing in an opposite direction. In still other arrangements, fluid directing baffles and/or conduits may be positioned within the chamber so that fluid is required to make multiple passes through the chamber, which can result in the fluid being exposed longer to the irradiating effects of UV light (or some other source of electromagnetic radiation). Also, in alternative arrangements the tubes in a chamber can be horizontally or angularly positioned. The fluid can be directed to flow (sideways) parallel to the longitudinal axis of elongated tubes, so that the fluid receives a predetermined proper amount of radiation exposure treatment.

Further, multiple chamber structures may be used to treat fluid within a particular treatment device. Such multiple chamber structures can be arranged to accommodate fluid flow therethrough in parallel. Other multiple chamber arrangements may require fluid to flow therethrough in a serial arrangement.

Numerous approaches may be used depending on the particular fluid treatment system configuration and operational requirements. Further it should be understood that the particular arrangement shown in which the chamber and radiation tubes extend generally vertically is exemplary, and in other arrangements other tube orientations may be used.

Example arrangements of a UV lamp support assembly have been described herein with reference to particular components, features, and methods. Other arrangements may include other components, features, and methods which provide similar capabilities and functionality.

In the foregoing description, certain terms may have been used to describe example support arrangements for purposes of brevity, clarity, and understanding. For example, certain terms like "left", "right", "outer", "inner", "front", "rear", "up", "down", "top", and "bottom" may have been used. However no unnecessary limitations are to be implied therefrom because such terms have been used descriptively of the figures and are intended to be broadly construed. The terms are not to present limitations on the scope of the exemplary embodiments, as defined by the claims hereof. Moreover, the descriptions and illustrations herein are by way of examples and the inventive teachings are not limited to the specific features shown and described.

It will be readily understood that the features of exemplary embodiments, as generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, as represented in the attached Figures, is not intended to limit the scope of the invention as claimed, but is merely representative of selected exemplary embodiments that implement the principles described herein.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries, and principles of the exemplary arrangements, the manner in which they are constructed and operated, and the advantages and useful results attained; the new and useful structures, devices, elements, arrangements, parts, combinations, systems, equipment, operations, methods, processes, and relationships are set forth in the appended claims.

I claim:

1. An apparatus comprising:
a fluid purification system mounting arrangement configured to provide ultraviolet lamp support, including:
  a quartz tube,
    wherein the tube includes therein, at least a portion of an ultraviolet lamp,
    wherein the tube comprises a tube outer diameter, a longitudinal axis, and a domed end,
  a cover plate,
    wherein the cover plate includes at least one cover plate aperture therethrough,
      wherein the at least one cover plate aperture includes a plate aperture,
  a support plate,
    wherein the support plate includes at least one fluid flow aperture therethrough,
    wherein the support plate includes at least one tube support aperture therethrough,
      wherein the at least one tube support aperture includes a support aperture,
        wherein the support aperture comprises a support aperture diameter,
  a coil spring,
    wherein the spring comprises a spring inner diameter,
  a one piece cup,
    wherein the cup is configured to hold at least a portion of the tube,
    wherein the cup includes an axis,
    wherein the cup includes a cylindrical wall segment,
      wherein the wall segment comprises an outer diameter that is less than the spring inner diameter,
    wherein the cup includes a first annular lip that extends radially outward further than the wall segment,
    wherein the cup includes a second annular lip that extends radially outward further than the wall segment,
      wherein the wall segment axially extends between the first annular lip and the second annular lip,
    wherein the cup includes a third annular lip that extends radially inward further than the wall segment, wherein the cup includes at least one slot that allows the cup to be in a non flexed condition or in a flexed condition,
  wherein with the cup in the non flexed condition:
    the first annular lip comprises an outer diameter that is greater than both the spring inner diameter and the support aperture diameter,
    the second annular lip comprises an outer diameter that is greater than both the spring inner diameter and the support aperture diameter,
    the wall segment comprises an inner diameter that is greater than the tube outer diameter, which allows the wall segment to receive an axial portion of the tube therein,
    the wall segment comprises an outer diameter that is less than the spring inner diameter,
    the third annular lip comprises an open inner diameter,
    wherein the open inner diameter is less than the tube outer diameter,
    wherein the open inner diameter allows at least a portion of the domed end to pass therethrough;
  wherein with the cup in the flexed condition at least one of the first annular lip or the second annular lip comprises an outer diameter that is less than both the spring inner diameter and the support aperture diameter, which allows:
    one of the first annular lip or the second annular lip to pass through a support aperture during installation of the cup in the support plate, and
    the spring to be fitted between the first annular lip and the second annular lip during installation of the spring around the wall segment;
  wherein in an installed arrangement involving the tube, the support plate, the cover plate, the spring, and the cup in the non flexed condition:
    the first annular lip is located on a first side of the support plate,
    the second annular lip is located on a second side of the support plate,
    wherein the cup is axially retained in the support plate,
    the wall segment extends between the tube and the support plate,
    an axial portion of the tube is received in the wall segment,
    at least a portion of the domed end passes through the open inner diameter of the third annular lip, and
    the spring is axially retained around the wall segment between the first annular lip and the support plate, which positioning of the spring is operative to cause
      the first annular lip to be biased away from the support plate, and
      the second annular lip to be biased toward the support plate, and
      the tube to be biased toward the cover plate through engagement with the third annular lip;
  wherein the installed arrangement prevents axial movement of the tube toward the cover plate,
  wherein the installed arrangement constrain transverse movement of the tube relative to the support plate,
  wherein the installed arrangement allows axial expansion movement of the tube through the support plate, which movement causes the first annular lip to compress the spring toward the support plate responsive to the third annular lip being pushed away from the support plate through engagement with the domed end.

2. The apparatus according to claim 1 wherein the at least one slot axially extends through at least one of the first annular lip or the second annular lip.

3. The apparatus according to claim 1 wherein the tube, the cover plate, the support plate, the spring, and the cup are part of a chamber,
  wherein the chamber includes a cylindrical chamber wall,
    wherein the cylindrical chamber wall axially extends between the end plate and the tube support plate,
  wherein the chamber includes a fluid inlet and a fluid outlet,
    wherein the fluid inlet and the fluid outlet pass through the cylindrical chamber wall.

4. The apparatus according to claim 3 wherein the chamber is part of a fluid purification system that includes a plurality of chambers,
  wherein each fluid inlet is connected to a shared flow inlet pipe,
  wherein each fluid outlet is connected to a shared flow outlet pipe,
    wherein both the fluid inlet and the fluid outlet of a respective chamber can be closed to fluidly isolate the respective chamber from both the shared flow inlet pipe and the shared flow inlet pipe.

5. The apparatus according to claim 3 wherein each chamber includes a plurality of quartz tubes,
  wherein each chamber includes a support cage assembly,
    wherein each support cage assembly includes the cover plate, tube support plate, a mid plate, and a plurality of support rods,
      wherein the support rods structurally differ from the tubes,
      wherein the support rods axially extend between the cover plate and the support plate,
      wherein the mid plate is axially located between the cover plate and the support plate,
        wherein the support rods extend through the mid plate,
        wherein the tubes extend through the mid plate,
          wherein the support rods are radially spaced from the tubes.

6. An apparatus comprising:
  a fluid purification arrangement including at least one chamber,
    wherein each chamber includes an outer chamber wall,
    wherein each chamber includes therein, a plurality of elongated electromagnetic radiation-emitting tubes,
      wherein each tube includes a cylindrical tube wall,
      wherein each tube comprises a longitudinal axis,
      wherein each tube includes a first end portion and a second end portion,
        wherein each first end portion is attached to a respective connection adapter,
        wherein each second end portion comprises a domed end,
    wherein each chamber includes at least one fluid inlet and at least one fluid outlet,
      wherein the at least one fluid inlet and the at least one fluid outlet are positioned to allow fluid in the chamber to flow substantially parallel to the axis,
    wherein each chamber includes an end plate, wherein the end plate engagingly contacts each connection adapter, which constrains axial movement of the first end portion relative to the end plate,
wherein each chamber includes a tube support plate,
wherein the support plate includes a first side surface and a second side surface,
wherein the second side surface is opposite the first side surface,
wherein the support plate includes a plurality of tube support apertures extending from the first side surface to the second side surface,
wherein each chamber includes a plurality of tube-holding cups,
wherein each respective cup is associated with a respective tube,
wherein each cup includes a first annular lip,
wherein the first annular lip is located on a first side of the support plate,
wherein each cup includes a wall segment,
wherein the wall segment is connected to the first annular lip,
wherein the wall segment axially extends through a respective tube support aperture, radially between the support plate and a portion of the cylindrical tube wall of the respective tube,
wherein the wall segment constrains radial movement of the respective tube relative to the support plate,
wherein each cup includes a second annular lip,
wherein the second annular lip is connected to the wall segment,
wherein the second annular lip is located on a second side of the support plate,
wherein each cup includes a foot,
wherein the foot is connected to the second annular lip,
wherein the foot is located on the second side of the support plate,
wherein the foot engages the domed end of the respective tube,
wherein each cup is associated with a respective spring,
wherein the spring extends around the wall segment between the first annular lip and the first side surface,
wherein the spring engages both the first annular lip and the first side surface,
wherein the cup and spring association is operative to provide a biasing force that acts to push the respective tube axially toward the cover plate, until the second annular lip engages the second side surface,
wherein while providing the biasing force, the cup and spring association allows the respective tube to axial expand through the respective tube support aperture,
wherein expansion of the respective tube causes the domed end to push the foot away from the second side surface,
wherein movement of the foot away from the second side surface causes the first annular lip to compress the spring toward the first side surface.

7. The apparatus according to claim 6 wherein the foot comprises a third annular lip,
wherein the third annular lip extends radially inward further than the wall segment,
wherein the third annular lip is located axially further away from the support plate than the second annular lip.

8. The apparatus according to claim 6
wherein the outer chamber wall comprises a cylindrical chamber wall,
wherein the cylindrical chamber wall axially extends between the end plate and the tube support plate,
wherein each chamber includes a fluid inlet and a fluid outlet,
wherein the fluid inlet and the fluid outlet pass through the cylindrical chamber wall.

9. The apparatus according to claim 8
wherein each fluid inlet is connected to a shared flow inlet pipe, wherein each fluid outlet is connected to a shared flow outlet pipe,
wherein both the fluid inlet and the fluid outlet of a respective chamber can be closed to fluidly isolate the respective chamber from both the shared flow inlet pipe and the shared flow inlet pipe,
wherein the electromagnetic radiation-emitting tubes include at least one UV light-emitting tube.

10. The apparatus according to claim 6 wherein each chamber includes a support cage assembly,
wherein each support cage assembly includes the end plate, the tube support plate, a mid plate, and a plurality of support rods,
wherein the support rods structurally differ from the tubes,
wherein the support rods axially extend between the end plate and the tube support plate,
wherein the mid plate is axially located between the end plate and the tube support plate,
wherein the support rods extend through the mid plate,
wherein the tubes extend through the mid plate,
wherein the support rods are radially spaced from the tubes.

11. An apparatus comprising:
a spring-loaded sleeve assembly configured to operatively provide axial support and radial support to an ultraviolet lamp-containing tube extending in a fluid purification system support plate,
wherein the assembly includes a tube support cup,
wherein the cup includes a longitudinal axis,
wherein the cup includes a first end portion located on a first side of the support plate and a second end portion located on a second side of the support plate,
wherein the first end portion includes a first projection,
wherein the second end portion includes a second projection and a third projection,
wherein relative to the first projection, the third projection is axially located further away than the second projection,
wherein the third projection is configured to engage a domed end of the tube,
wherein the cup includes an axially-extending cylindrical segment that connects the first projection and the second projection,
wherein the segment extends radially outward less than both the first projection and the second projection,
wherein the segment extends radially outward further than the third projection,
wherein the segment in operative position in a support plate aperture radially between the tube and the support plate, provides the radial support to the tube, wherein the assembly includes a coil spring,
wherein the spring comprises an inner radial section which extends radially outward less than the first projection, which causes the spring to be retained in an operative position around the segment between the first projection and the support plate,
wherein the spring causes the second projection to be biased toward the support plate and the third projection to be biased toward the domed end,
wherein engagement of the third projection with the domed end imparts a spring biasing force to the tube, which provides the axial support to the tube,
wherein the assembly is configured to allow axial expansion of the tube to overcome the spring biasing force, which expansion causes the domed end to move the third projection away from the support plate, which movement causes the first projection to compress the spring against the support plate.

12. The apparatus according to claim 11 wherein the cup comprises a one piece cup,
wherein the first projection comprises a first annularly extending lip, wherein the first annularly extending lip extends radially outward,
wherein the second projection comprises a second annularly extending lip,
wherein the second annularly extending lip extends radially outward.

13. The apparatus according to claim 12 wherein the third projection comprises a third annularly extending lip, wherein the third annularly extending lip extends radially inward.

14. The apparatus according to claim 12 wherein the first annularly extending lip and the second annularly extending lip extend radially outward a substantially same distance.

15. The apparatus according to claim 14 wherein the cup includes at least one axially extending slot that allows the cup to be changed between a flexed condition and a non flexed condition,
wherein the at least one axially extending slot extends through at least one of the first annularly extending lip or the second annularly extending lip.

16. The apparatus according to claim 15 wherein the at least one axially extending slot extends through both the first annularly extending lip and the second annularly extending lip.

17. The apparatus according to claim 12 wherein the assembly is located in an aperture of a support plate of a support cage assembly,
wherein the support cage assembly includes a plurality of ultraviolet lamp-containing tubes between a cover plate and the support plate,
wherein the support plate includes both support apertures and flow apertures,
wherein the flow apertures differ in contour from the support apertures,
wherein the support apertures are sized to receive a tube therein,
wherein the cover plate includes support apertures but is absent flow apertures,
wherein the support cage assembly includes a plurality of support rods extending between the cover plate and the support plate,
wherein the support rods are radially spaced from the tubes.

18. The apparatus according to claim 17 wherein the support cage assembly includes a mid plate that is axially located between the cover plate and the support plate,
wherein the mid plate includes support apertures, flow apertures, and rod apertures,
wherein each tube extends through a respective support aperture, and
wherein each support rod extends through a respective rod aperture.

19. The apparatus according to claim 18 wherein the mid plate is substantially identical to the support plate.

20. The apparatus according to claim 17 wherein the assembly is located in a fluid purification system that includes a plurality of chambers,
wherein each chamber includes a support cage assembly that comprises ultraviolet lamp-containing tubes and support rods between the cover plate and the support plate,
wherein each chamber includes a cylindrical wall that axially extends between the cover plate and the support plate,
wherein each chamber includes a fluid inlet and a fluid outlet extending through the cylindrical wall,
wherein the fluid inlet is connected to a shared flow inlet pipe,
wherein the fluid outlet is connected to a shared flow outlet pipe,
wherein both the fluid inlet and the fluid outlet can be closed to fluidly isolate the chamber from both the shared flow inlet pipe and the shared flow inlet pipe.

* * * * *